(12) United States Patent
Tahara et al.

(10) Patent No.: US 6,938,713 B1
(45) Date of Patent: Sep. 6, 2005

(54) DYNAMOTOR OF HYBRID VEHICLE, AND METHOD OF CONTROL THEREOF

(75) Inventors: Kazuo Tahara, Hitachi (JP); Houng Joong Kim, Hitachi (JP); Tsunehiro Endo, Hitachiota (JP); Ryoso Masaki, Hitachi (JP); Kou Ajima, Hitachiota (JP); Toshiyuki Innami, Mito (JP); Keiichi Mashino, Hitachinaka (JP); Yoshimi Sakurai, Hitachiota (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/936,481

(22) PCT Filed: Sep. 20, 1999

(86) PCT No.: PCT/JP99/05115

§ 371 (c)(1),
(2), (4) Date: Dec. 26, 2001

(87) PCT Pub. No.: WO01/21431

PCT Pub. Date: Mar. 29, 2001

(51) Int. Cl.$^7$ .............................................. B60K 6/08
(52) U.S. Cl. ..................................... 180/65.3; 318/139
(58) Field of Search ............................. 180/65.1, 65.3; 307/64, 66; 318/139, 245, 254; 320/32, 17, 320/40, 64; 322/46, 28, 90, 94

(56) References Cited

U.S. PATENT DOCUMENTS

| | | | |
|---|---|---|---|
| 4,119,862 A * | 10/1978 | Gocho ........................ 290/17 |
| 4,597,463 A * | 7/1986 | Barnard ....................... 180/165 |
| 5,081,365 A | 1/1992 | Field et al. | |
| 5,214,358 A | 5/1993 | Marshall | |
| 5,550,445 A * | 8/1996 | Nii ............................... 318/153 |
| 5,586,613 A | 12/1996 | Ehsani | |
| 5,848,659 A * | 12/1998 | Karg et al. ................. 180/65.4 |
| 6,066,928 A * | 5/2000 | Kinoshita et al. ........... 318/139 |
| 6,232,744 B1 * | 5/2001 | Kawai et al. ................ 320/132 |
| 6,369,532 B2 * | 4/2002 | Koenen et al. ............. 318/150 |

(Continued)

FOREIGN PATENT DOCUMENTS

JP 2-206302 8/1990

(Continued)

*Primary Examiner*—J. Allen Shriver
(74) *Attorney, Agent, or Firm*—Crowell & Moring LLP

(57) ABSTRACT

The present invention is characterized by a hybrid car comprising a motor generator mechanically connected with the crank shaft of an internal combustion engine for driving a car wherein the internal combustion engine is started by electric power supplied by a battery and power is generated by rotation from the internal combustion engine to charge the battery, an inverter for controlling the drive and power generation of the motor generator, and a control circuit for controlling the inverter, this hybrid car further characterized in that the motor generator is driven by battery power to start the internal combustion engine, and after the internal combustion engine has started, the battery is charged by the generator mode operation of the motor generator using the power of the internal combustion engine, wherein a step-down chopper circuit is provided between the battery and the inverter, and step-down control is provided to ensure that the power generation voltage will reach the level of the battery charging voltage through the step-down chopper circuit.

21 Claims, 9 Drawing Sheets

U.S. PATENT DOCUMENTS

| | | | |
|---|---|---|---|
| 6,462,430 B1 * | 10/2002 | Joong et al. | 290/40 |
| 6,476,571 B1 * | 11/2002 | Sasaki | 318/139 |
| 6,546,320 B2 * | 4/2003 | Shimizu et al. | 701/22 |
| 6,577,087 B2 * | 6/2003 | Su | 318/254 |

FOREIGN PATENT DOCUMENTS

| | | |
|---|---|---|
| JP | 5-22804 | 1/1993 |
| JP | 5-30606 | 2/1993 |
| JP | 5-260610 | 10/1993 |
| JP | 06-245322 | 9/1994 |
| JP | 07-298696 | 11/1995 |
| JP | 10-138904 | 5/1998 |
| JP | 11-4506 | 1/1999 |
| JP | 11-220812 | 8/1999 |

* cited by examiner

| OPERATION MODE | START OF INTERNAL COMBUSTION ENGINE | TORQUE ASSIST FOR INTERNAL COMBUSTION ENGINE | POWER GENERATION |
|---|---|---|---|
| CONTROL | (STEP-UP CHOPPER)+ STRONG MAGNETIC FIELD | (STEP-UP CHOPPER)+ STRONG MAGNETIC FIELD WEAK MAGNETIC FIELD | STEP-DOWN CHOPPER+ WEAK MAGNETIC FIELD |

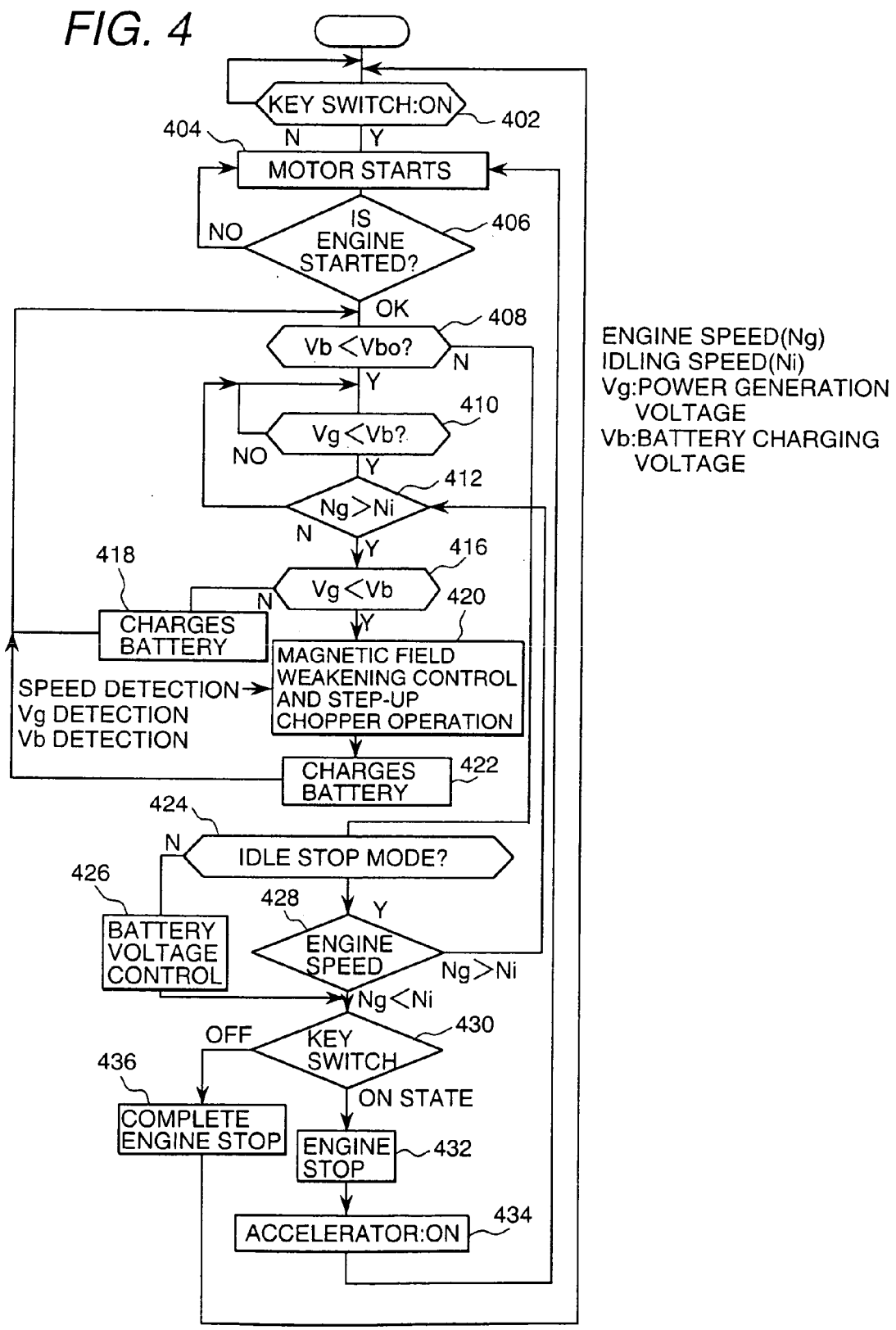

DYNAMOTOR OF HYBRID VEHICLE, AND METHOD OF CONTROL THEREOF

TECHNICAL FIELD

The invention relates to a motor generator and its control method in a hybrid car comprising a motor generator connected to an engine as a drive source, and particularly to a motor generator and its control method capable of controlling the armature current phase and adjusting field current component.

BACKGROUND ART

There are two methods for driving a hybrid car according to the prior art: One is a series hybrid method wherein power is obtained by driving a generator by the driving speed of an engine as an internal combustion engine, and this power is used to drive the motor connected to the axle, then a car is driven by the driving force of the motor (Japanese Application Patent Laid-Open Publication No. Hei 08-298696, Japanese Application Patent Laid-Open Publication No. Hei 06-245322 and Official Gazette of U.S. Pat. No. 5,214,358, for example). The other is a parallel hybrid method wherein part of the driving force of the internal combustion engine is converted into electric power, and the remaining driving force is transmitted to the axle as driving force. Thus, the car is driven by both of motor driving force provided by generated electric power and axle driving force given by an internal combustion engine (Official Gazette of U.S. Pat. No. 5,081,365, for example).

According to the prior art, however, two motors and inverter circuits for driving these motors are necessary, and a new planetary gear mechanism must be installed. This requires a substantial improvement of a car, and resulting increase in costs cannot be avoided.

To solve this problem, a one-motor method is proposed as disclosed in the Official Gazette of Japanese Application Patent Laid-Open Publication No. Hei 07-298696. According to this method, an electric rotating machine is directly coupled to the crank shaft of an internal combustion engine, and driving and power generation are performed by one electric rotating machine through switching of operation mode. This method is more advantageous than the two-motor method discussed above in that the cost is lower and this feature can be added onto the current car.

For both the one-motor method and two-motor method, the following motor generator is used as an electric rotating machine; (1) a synchronous magnet type motor generator with a permanent magnet mounted on the rotor, (2) a synchronous motor generator of jaw type magnetic pole based on the same principle as that of an alternator as a car generator, or (3) a squirrel cage type induction motor generator with a secondary conductor of squirrel cage type installed on the rotor. Inverter control is adopted as follows: When the internal combustion engine is started, the output voltage of a 42-volt battery is adjusted by controlling the voltage, current and frequency by an inverter, and the motor generator is driven in the motor operation mode. After the internal combustion engine has started, the motor generator is driven in power generation mode so that power generation voltage will reach the level of battery charging voltage.

In the meantime, Japanese Application Patent Laid-Open Publication No. Hei 11-220812 discloses the method wherein a step up/down chopper is installed between the battery and inverter to ensure that d. c. input voltage of the inverter or the like is kept almost constant.

[Problems to be Solved by the Invention]

The following problems are found in the one-motor type motor generator used as a motor generator in a hybrid car:

(1) Compatibility must be ensured between high torque characteristic in the low speed area at the start of the internal combustion engine, and high output power generation characteristic capable of getting a high power generation current in the range from idling speed to high speed.

(2) There is a relation of 1 to 10 or more between the rotational speed (about 700 rpm) for generating torque (maximum torque generated by the motor) required at the start of internal combustion engine in (1) and motor rotational speed (6000 rpm or more) at the maximum permissible rotational speed of the internal combustion engine.

(3) There is a shortage of the assist torque for promoting the torque of internal combustion engine at the rotational speed equal to or greater than the rotational speed when the internal combustion engine starts.

(4) The motor generator mounted on the car operates in the motor operation mode at the time of startup and generates power in the generator mode. A battery which is charged or discharged within the voltage fluctuation range with reference to a certain voltage is used as a power source. So the battery may be damaged in the worst case if it is charged with the voltage far exceeding the battery charging voltage, for example, at a high speed of the internal combustion engine.

The above problems must be solved when any one of the above-mentioned motor generators is used. Generally, when the motor of the motor generator is operated, rotational speed N is proportional to the applied voltage V and is inversely proportional to field magnetic flux $\phi$.

Torque $\tau$ is proportional to the product of motor current Im and field magnetic flux $\phi$. The counter electromotive force in motor operation and power generation voltage in generator mode operation are proportional to the product of rotational speed N and field magnetic field $\phi$. Accordingly, the system must be configured to ensure that any motor generator can provide the required torque and generation power even when the rotational speed range is wide.

Generally current phase is controlled in such a way that strong field current component is obtained when a high torque is required at a low rotational speed, and weak field current component is obtained at a high rotational speed to reduce counter electromotive force.

However, when the motor generator is operated in the generation mode, generation is performed in the range from the idling speed (about 700 rpm) of the internal combustion engine to the maximum rotational speed (6000 rpm or more) of the internal combustion engine. So at a high rotational speed, power generation voltage becomes excessive in the method of adjusting the current phase of the stator winding. As a result, there is a shortage of weak field current component, and it is difficult to reach agreement with battery charging voltage. Further, when the internal combustion engine is started by motor operation, the starting current of the motor is excessive, current capacity of the switching element in the main circuit of the inverter becomes excessive, and this gives rise to problems.

The object of the present invention is to solve the above-mentioned problems and to provide a motor generator and control method thereof in a battery-mounted hybrid car wherein the motor generator connected to an internal combustion engine is operated in the motor operation mode or generator operation mode within the range from high to low speeds. This motor generator and control method thereof is further characterized in that stable power torque characteristic and power generation characteristic can be obtained and highly efficient control is ensured.

DISCLOSURE OF INVENTION

The present invention is characterized by a hybrid car comprising a motor generator mechanically connected with the crank shaft of an internal combustion engine for driving a car wherein the internal combustion engine is started by electric power supplied by a battery and power is generated by rotation from the internal combustion engine to charge the battery, an inverter for controlling the drive and power generation of the motor generator, and a control circuit for controlling the inverter, this hybrid car further characterized in that the motor generator is driven by battery power to start the internal combustion engine, and after the internal combustion engine has started, the battery is charged by the generator mode operation of the motor generator using the power of the internal combustion engine, wherein a step-down chopper circuit is provided between the battery and the inverter, and step-down control is provided to ensure that the power generation voltage will reach the level of the battery charging voltage through the step-down chopper circuit.

The present invention is further characterized by a hybrid car comprising a motor generator mechanically connected with the crank shaft of an internal combustion engine for driving a car wherein the internal combustion engine is started by electric power supplied by a battery and power is generated by rotation from the internal combustion engine to charge the battery, an inverter for controlling the drive and power generation of the motor generator, and a control circuit for controlling the inverter, this hybrid car still further characterized in that the motor generator is driven by battery power to start the internal combustion engine, and, after the internal combustion engine has started, the battery is charged by the generator mode operation of the motor generator using the power of the internal combustion engine, wherein a step-up chopper circuit is provided on the output side of the battery, and, when the motor generator is started by the electric power of the battery, the battery voltage is stepped up to drive the motor generator and to start the internal combustion engine.

The present invention is further characterized by a motor generator control method for a hybrid car comprising a motor generator mechanically connected with the crank shaft of an internal combustion engine for driving a car wherein the internal combustion engine is started by electric power supplied by a battery and power is generated by rotation from the internal combustion engine to charge the battery, an inverter for controlling the drive and power generation of the motor generator, and a control circuit for controlling the inverter, this hybrid car still further characterized in that the motor generator is driven by battery power to start the internal combustion engine, and, after the internal combustion engine has started, the battery is charged by the generator mode operation of the motor generator using the power of the internal combustion engine, wherein step-down control is provided to ensure that the power generation voltage will reach the level of the battery charging voltage through the step-down chopper circuit when the power generation voltage of the motor generator is higher than the battery charging voltage.

According to the present invention, when the motor generator is used as a motor to start the internal combustion engine or to provide torque assist, battery voltage is stepped up by the step-up circuit and is applied to the inverter input. At the same time, the inverter provides control to get the rotational speed specified by a command. In other words, the current phase of the stator winding is adjusted and the amount of field magnetic flux component is regulated, thereby obtaining a specified speed, a specified armature current and a specified torque. This allows a high voltage to be obtained by means of a step-up chopper circuit and permits the field current component, hence, starting torque to be increased.

Further, when power generation voltage is greater than battery charging voltage in the generation operation mode, a high power generation voltage can be stepped down by a step-down chopper provided between the battery and inverter input terminal to reach agreement with battery charging voltage.

As described above, the present invention provides a motor generator and control method thereof in a battery-mounted hybrid car wherein the motor generator connected to the internal combustion engine is operated in the motor or generator mode within the range from low to high speed. Stable power torque characteristic and power generation characteristic can be obtained and highly efficient control is ensured.

BRIEF DESCRIPTION OF THE DRAWINGS

FIG. 4 is a flow diagram representing the operation of the present invention;

BEST EMBODIMENTS FOR CARRYING OUT THE INVENTION

Figure 1:
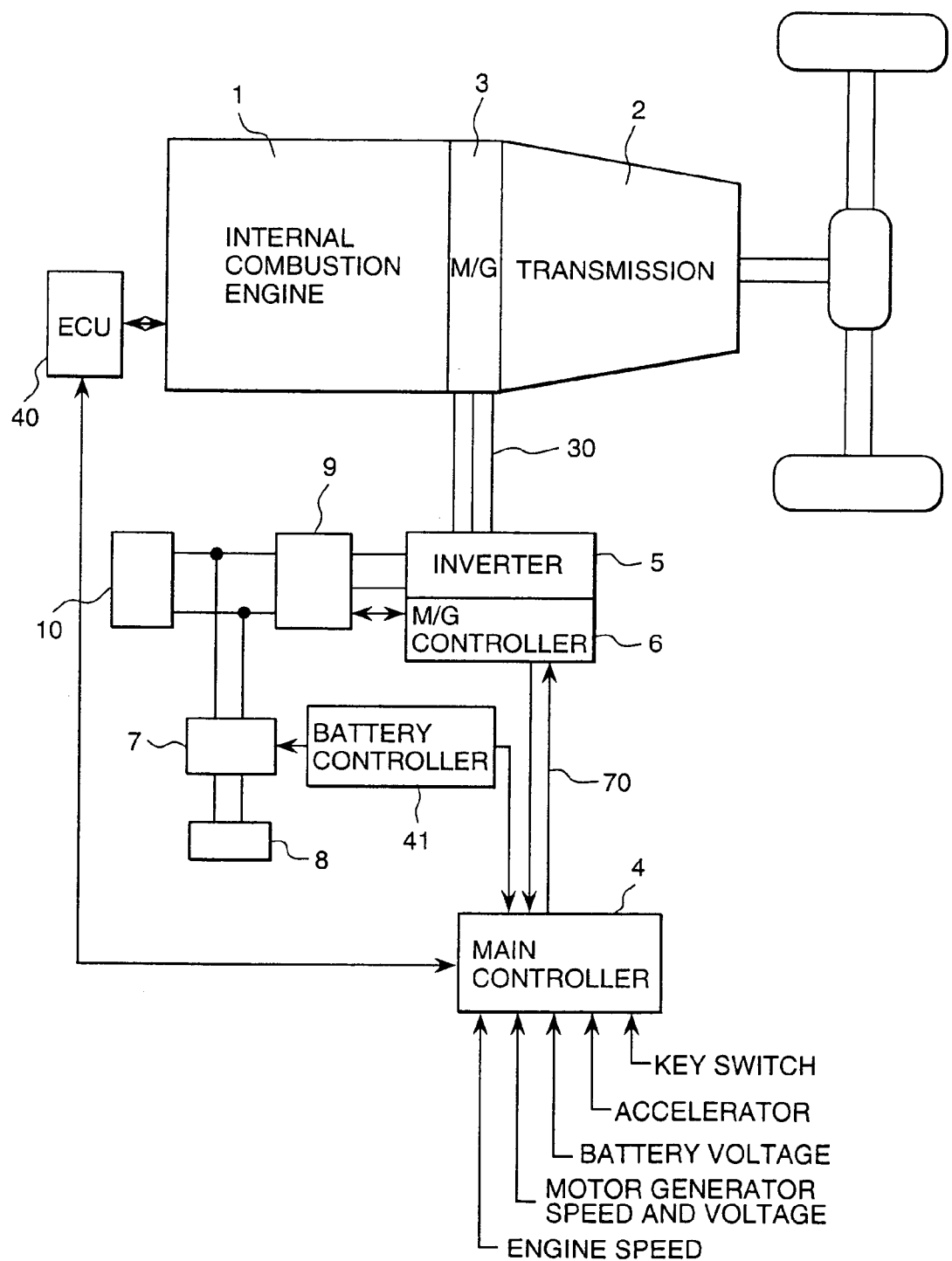
FIG. 1 is a block diagram representing the system configuration of a motor generator for a car as one embodiment of the present invention.

The following describes embodiments according to the present invention with reference to drawings: FIG. 1 is a block diagram representing the basic configuration of the motor generator system in a hybrid car adopting a permanent magnet field type synchronous motor generator.

In the motor generator system of FIG. 1, a motor generator 3 drives an internal combustion engine 1 and operates in the generator mode after the internal combustion engine 1 has started. The main battery 10 for high voltage (for example, 42-volt system) is charged with generated power. In this configuration, a motor generator 3 of flat structure is installed between the internal combustion engine 1 and transmission 2. The motor generator 3 is a permanent magnet field type synchronous motor generator in this case. The output of the motor generator 3 is led to the step-down chopper circuit 9 through the inverter main circuit 5, and the generated voltage is stepped down to reach the level of the specified battery charging voltage at the step-down chopper circuit 9 and is supplied to the main battery 10. Further, auxiliary battery 8 for low voltage (14 volts, for example) is connected to the step-down chopper circuit 9 in parallel with the main battery 10. The auxiliary battery 8 is connected to a lamp load and audio equipment (not illustrated).

Overall control of a hybrid car is made by a main controller 4. The motor generator control circuit 6 controls the inverter main circuit 5 and step-down chopper circuit 9 based on the operation command signal 70 or the like from this main controller 4. According to command and the like from the main controller 4, engine control unit 40 controls the internal combustion engine 1. Similarly, in conformity to the command or the like from the main controller 4, the battery controller 41 controls the DC-DC converter 7 to keep the output from the motor generator 3 at 14-volt charging voltage, thereby charging the voltage battery 8.

When the internal combustion engine 1 is to be started, it is started by motor mode operation of the motor generator 3. Namely, for current from the main battery 10, battery power enters the inverter main circuit 5 through the diode, and the output of the inverter main circuit 5 is controlled to become a specified electric power by the control software of the motor generator control circuit 6. The motor generator 3 operates as a motor to start the internal combustion engine 1.

In the meantime, operation of the motor generator 3 in the generation mode is to charge the battery after the internal combustion engine 1 has started. This operation holds good when the motor generator 3 is put into the generator operation mode by power from the internal combustion engine 1, and the voltage on the input side of the inverter 5 or the generation voltage Vg on the side of motor generator 3 and battery charging voltage Bb1 has a relation of is Vb1≦Vg. Regardless of any mode of car operation, Vg is controlled to reach the level of battery charging voltage when the battery is charged. If generation voltage Vg is greater than battery charging voltage Vb1, it is controlled by the motor generator control circuit 6 constituting the main circuit 5 of the inverter. The mount of field magnetic flux component is controlled to reach weak field by the current phase control of armature current to ensure that generation voltage will reach the level of battery charging voltage.

Figure 2:
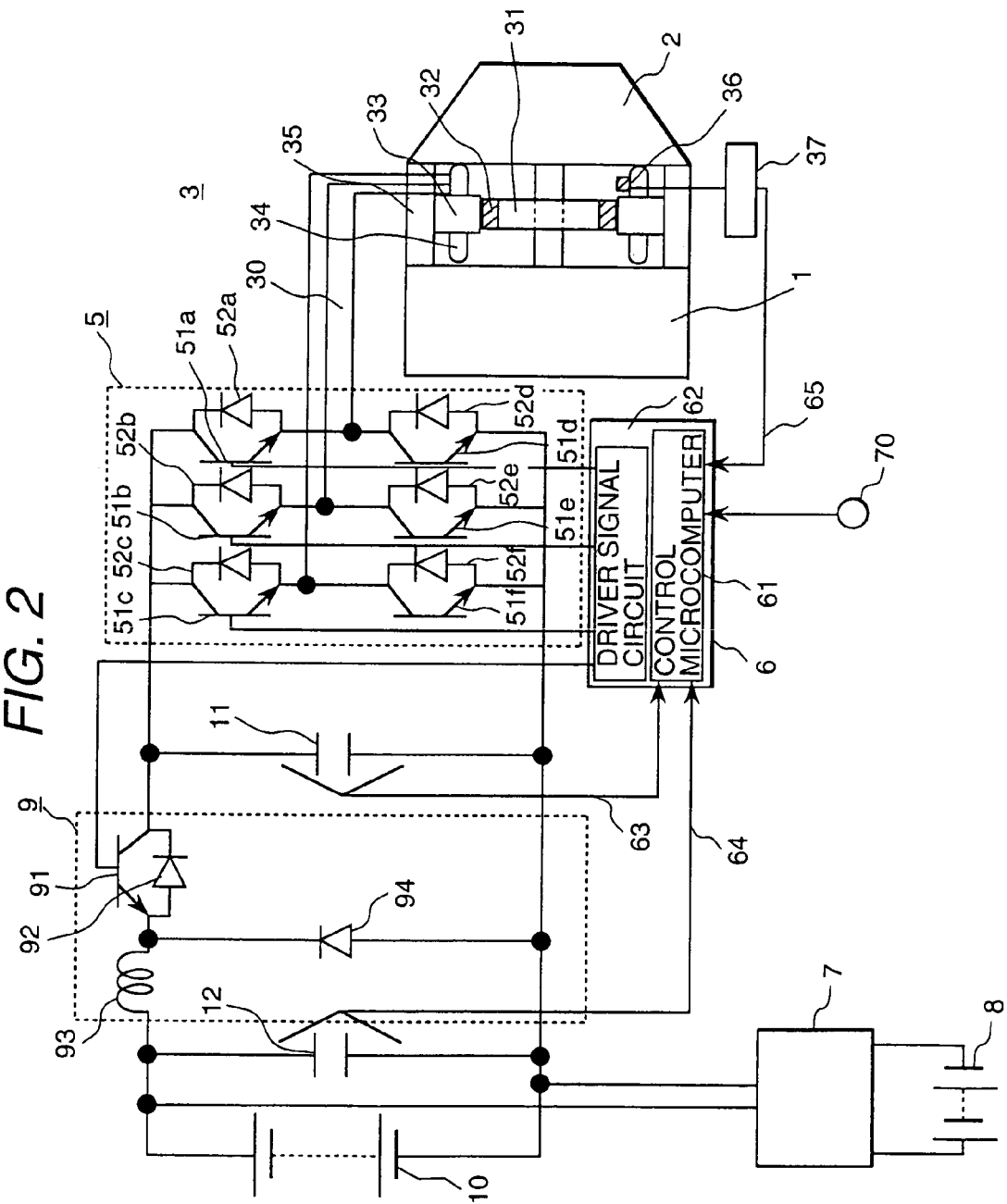
FIG. 2 is a circuit configuration diagram representing a motor generator and system as one embodiment of the present invention.

FIG. 2 shows an example of a detailed circuit. A motor generator 3 is installed between the internal combustion engine 1 and transmission 2. A step-down chopper circuits 9 are installed among the inverter 5, main battery 10 and auxiliary battery 8. The motor generator control circuit 6 contains a microcomputer for control 61 and driver signal circuit 62. The microcomputer 61 for control contains a central processor unit, memory and various control software programs stored in the memory. It incorporates the operation command signal 70 from the main controller 4, inverter input voltage signal 63, charging voltage signal 64, the current of motor generator 3 and position detecting signal (and rotational speed signal) 65, and generates and outputs the control signal of the driver signal circuit 62 and the control signal of the step-down chopper circuit 9.

The rotor of the permanent magnet field type synchronous motor generator 3 is composed of a rotor core 31 and permanent magnet field 32 constituting the magnetic pole. A jaw type magnetic pole motor generator can be used as the motor generator. In that case, the rotor is made up of jaw type magnetic south and north poles surrounding the exciting coil. Further, an induction motor may be used as the motor generator. In that case, the rotor is formed with secondary conductors arranged in a squirrel cage shape in the slot inside the rotor core.

In the meantime, the stator is designed in a structure with three-phase stator winding 34 wound in the slot provided inside the stator core 33. A housing 35 is shrinkage-fit on the periphery. A water cooling passage (not illustrated) for cooling is provided. Either of the normal distributed winding and concentrated winding can be used for three-phase stator winding 34.

The rotors (31 and 32) of the motor generator 3 are directly connected with the crank shaft of the internal combustion engine 1. If the motor generator 3 is installed inside the transmission 2, the rotor of the motor generator 3 is directly connected to the shaft of the transmission.

The terminal of the three-phase stator winding on the permanent magnet type inductive synchronous motor generator 3 mechanically connected to the internal combustion engine 1 is electrically connected to the inverter main circuit 5 through three-phase wiring 4. The inverter main circuit 5 comprises the switching elements 51a to 51f of each theephase arm and feedback diodes 52a to 52f. The switching operation of switching element 51a to 51f is performed by the driver signal generator 62 of the M/G control circuit 6. Driver signal circuit 62 is controlled by the control signal of the microcomputer 61 for control.

A smoothing capacitor 11 is mounted on the input side of the inverter main circuit 5. Further, a step-down choppers 9 are installed among the main battery 10, capacitor 12 and smoothing capacitor 11. The step-down chopper 9 is composed of a switching element 91, antiparallel circuit of diode 92, reactor 93 and diode 94.

In FIG. 2, when the internal combustion engine 1 is started, electric power of the main battery 10 charges the capacitor 12. It also charges the smoothing capacitor 11 through reactor 93 and diode 92, and the voltage is applied to the inverter main circuit 5. The motor generator control circuit 6 for operation of the inverter main circuit 5 incorporates the position signal (and rotational speed signal) 65 from the position detecting circuit 37 into a microcomputer 61 by the detecting signal of position sensor (hall IC, resolver, etc.) 36 of the motor generator 3. The output from the smoothing capacitor 11 and main battery 10 or signal 64 of charging voltage (inverter input voltage) is detected and incorporated into the control microcomputer 61. The microcomputer 61 uses in the motor operation mode operation command signal 70, position detecting signal (and rotational speed signal)65, battery output voltage signal 64 and inverter input voltage signal 63 and other detecting signals to create signals to be sent to the driver signal generator 62, and sends driver signals to the gates of switching elements 51a to 51f to start the motor or provide torque assist.

Figures 3, 5:
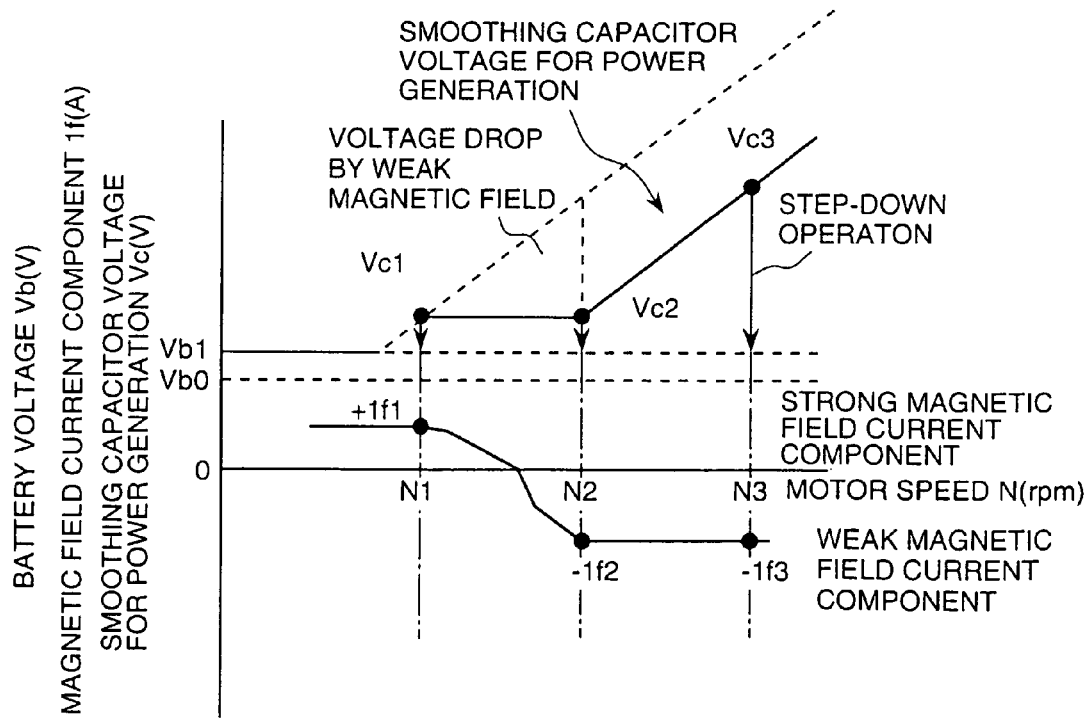
FIG. 3 is an explanatory diagram representing the operation mode of the present invention.
FIG. 5 is an explanatory diagram representing the system operation when the step-down chopper is operating in the generator mode of the motor generator as one embodiment of the present invention.

FIG. 3 is an explanatory diagram representing the operation mode and relationship between the motor control and battery voltage Vb according to the present invention. Strong field control is carried out when the internal combustion engine is started. In other words, the control microcomputer 61 provides a 5 PWM control (pulse width modulation) of the inverter main circuit 5 in conformity to operation command signal 70 at the time of startup. To increase the starting torque, driver signal is controlled to ensure that the current phase flowing to the stator winding during motor operation is increased to If1 by field current component If when the motor is operated (strong field control).

If torque assist function is required after internal combustion engine has started, strong field control and step-up operation is performed. If the rotational speed has increased, driver signal is controlled to ensure that the field current component is reduced to down –If (weak field control), and current phase is adjusted.

When there is a further increase in internal combustion engine speed, the generation mode is established. Generation voltage of the motor generator 3 becomes higher than the charging voltage Vb0 of the main battery 10. So while weak field control is performed or conduction rate of the step-down chopper is reduced, voltage control of the step-down chopper is performed to ensure that the generation voltage will agree with the charging voltage of the main battery 10.

The embodiment shown in FIGS. 1 and 2, illustrates the case of the above-mentioned startup and generation operation. Other embodiments to be discussed later shows the cases of above-mentioned torque assisted operation.

Figure 6:
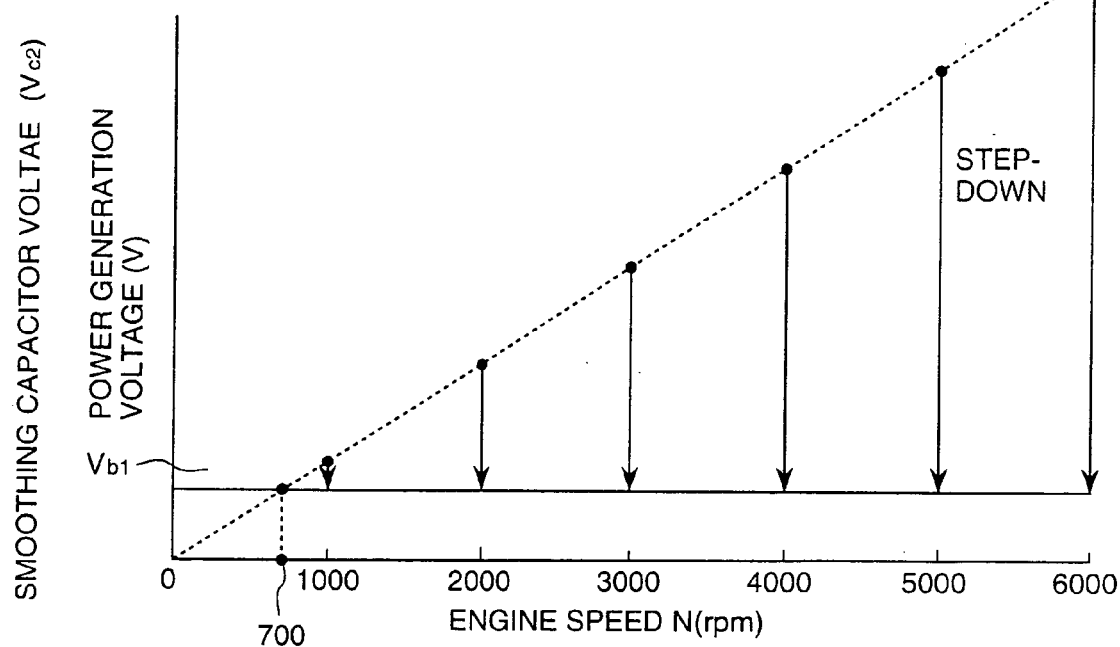
FIG. 6 is an explanatory diagram representing the step-down chopper.

The following describes the generation operation of the motor generator 3 in the embodiment shown in the above-mentioned FIGS. 1 and 2 with reference to FIGS. 4 to 6:

FIG. 4 is a flow chart representing the generation operation of the motor generator 3. When the key switch is turned on (Step 402), the internal combustion engine is driven by the motor generator 3 (Step 404), and the internal combustion engine starts up (Step 406). If the charging voltage Vb of the main battery 10 has not reached the specified charging voltage Vb (Step 408) after it has started, the system waits until charging voltage Vb is reached (Step 410). Then check is made to see if the idling speed has reached or not (Step 412). If it is reached, generation operation mode starts. In the generation operation mode, the rotating power of the internal combustion engine 1 becomes the input of the generator input to get the generation power of voltage Vg. The generator also charges the smoothing capacitor 11 at three-phase alternating current (Steps 416 to 418) through diodes 52a to 52f of the inverter main circuit 5. If the voltage Vg of smoothing capacitor 11 has reached the charging voltage Vb of the main battery 10, the conduction rate of the switching element 91 of the step-down chopper 9 is set to 100% (Step 420) and main battery 10 is charged through reactor 93 (Step 422).

In other words, when the rotational speed of the internal combustion engine has increased, the generation voltage of the motor generator 3 reaches the level higher than the charging voltage of the main battery 5. So the current phase of the inverter main circuit 5 is controlled, and weak field control is provided to ensure that the generation voltage is reduced. This makes it possible to control generation voltage to a certain speed. If the speed is higher, there is a limit to the winding temperature rise. So while a slight weak field control is performed or the conduction rate of the step-down chopper is reduced, the voltage control of step-down chopper is performed to ensure agreement with the charging voltage of the main battery 10.

FIG. 5 shows this operation. The horizontal axis indicates the rotational speed of the internal combustion engine 1 (rotational speed of motor generator 3). The vertical axis indicates the capacitor voltage Vc 1 of the smoothing capacity 11 determined by the generation voltage Vg of the motor generator 3. It shows the changes with respect to rotational speed when strong field control is made by adjustment of the phase of the armature current and when weak field control is performed.

In FIG. 5, assume that the rotational speed is N1 in the idling mode when the internal combustion engine 1 is started. Also assume in this case that smoothing capacitor voltage resulting from generation voltage is Vc1 with the minimum charging current maintained. In this case, if the field component of the generation motor 3 is subjected to strong field control, field current component If1 is on the strong field side. When the rotational speed of the internal combustion engine 1 rises to reach N2, generation voltage Vg2 is reached, and the voltage of the smoothing capacitor reaches a large value of Vc2. The current phase of the motor is controlled so that the voltage Vc2 of the smoothing capacitor agrees with battery charging voltage Vb1, and weak field current control is performed. In this case, if control can be made by weak field current component alone to get the battery charging voltage, then the step-down chopper circuit need not operate. If the rotational speed rises to N2 or more, there will be an increase in copper loss due to weak field control. So when the rotational speed is N2 or more, the step-down chopper circuit 9 is operated, and the voltage change ratio is set at a higher value so that the voltage Vc2 of the smoothing capacitor 11 agrees with the battery charging voltage Vb1, thereby charging the main battery 10.

Further, when the rotational speed of the internal combustion engine 1 rises to reach the maximum rotational speed N1, the weak field current component cannot be increased. So voltage change ratio (Vc3/Vb1) of the step-down chopper 6 is further increased, and this permits the main battery 10 to be charged even at the maximum rotational speed. Here the amount of weak field current control and the voltage change ratio of the step-down chopper can be set to ensure that the maximum generation efficiency can be provided.

FIG. 6 shows the relationship between the rotational speed N of the internal combustion engine 1 and the voltage Vc2 of the smoothing capacitor in the above-mentioned embodiments. When rotational speed N is 700 rpm or more, there is an increase in the amount of voltage step-down due to the step-down chopper in response to the increase in the rotational speed N. Thus, the voltage Vc2 of the smoothing capacitor is maintained at a certain value Vb1.

Let us go back to the generation operation flow of the motor generator 3 in FIG. 4. In Step 408, when the charging voltage Vb of the main battery 10 has reached the specified charging voltage Vb or charging voltage Vb has been reached by generation after startup, evaluation is made to determine if the system in the idle stop mode or not (Step 424). If the idle stop mode is not established, battery voltage control continues (Step 426). In the case of idle stop for temporary operation shutdown (Step 430). the engine stops (Step 432). After the accelerator is turned on again (Step 404), the engine is restarted by the motor generator 315.

When the key switch is off, the engine is stopped and the system goes back to Step 4042.

FIGS. 7 to 11 show an embodiment according to the present invention. As discussed earlier, when torque assist function is required after start of the internal combustion engine the strong field control and step-up operation are performed in this embodiment. The current phase is adjusted by controlling the driver signal so that the field current component is reduced down to $-If2$ (weak field control), if there is a further increase in rotational speed.

Figure 7:
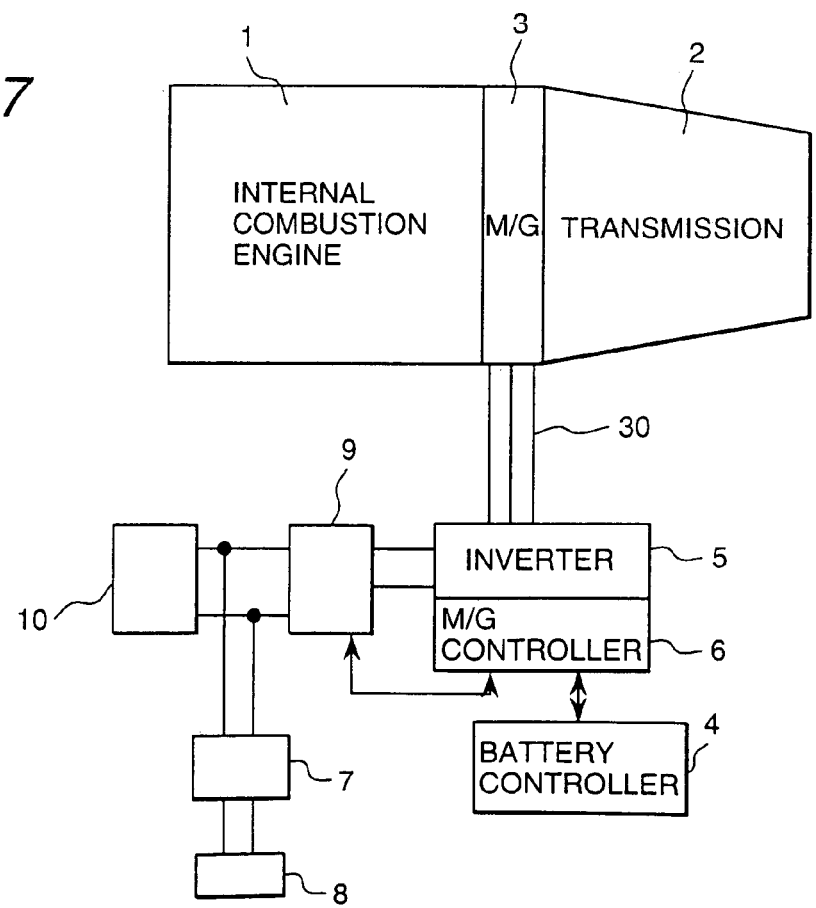
FIG. 7 is a block diagram representing the system-configuration of a motor generator for a car as another embodiment of the present invention.

First, FIG. 7 shows the main configuration of the motor generator drive system, similarly to FIG. 1. In this embodiment, a step-up/down chopper circuit 100 having a the step-down and step-up function is installed between the main battery 10 and inverter main circuit 5. In the motor operation mode, the inverter main circuit 5 and control circuit 6 are used to control the current phase of the stator winding and to operate the step-up chopper circuit 100. In the generation operation mode, the current phase of the stator winding is controlled and step-down chopper circuit 9 is operated, similarly to FIG. 1. This configuration is intended to ensure that voltage is always controlled to ensure that the generation voltage will be kept at the level of the battery charging voltage. The devices such as the main controller having the same configuration as FIG. 1 will not be illustrated.

Figure 8:
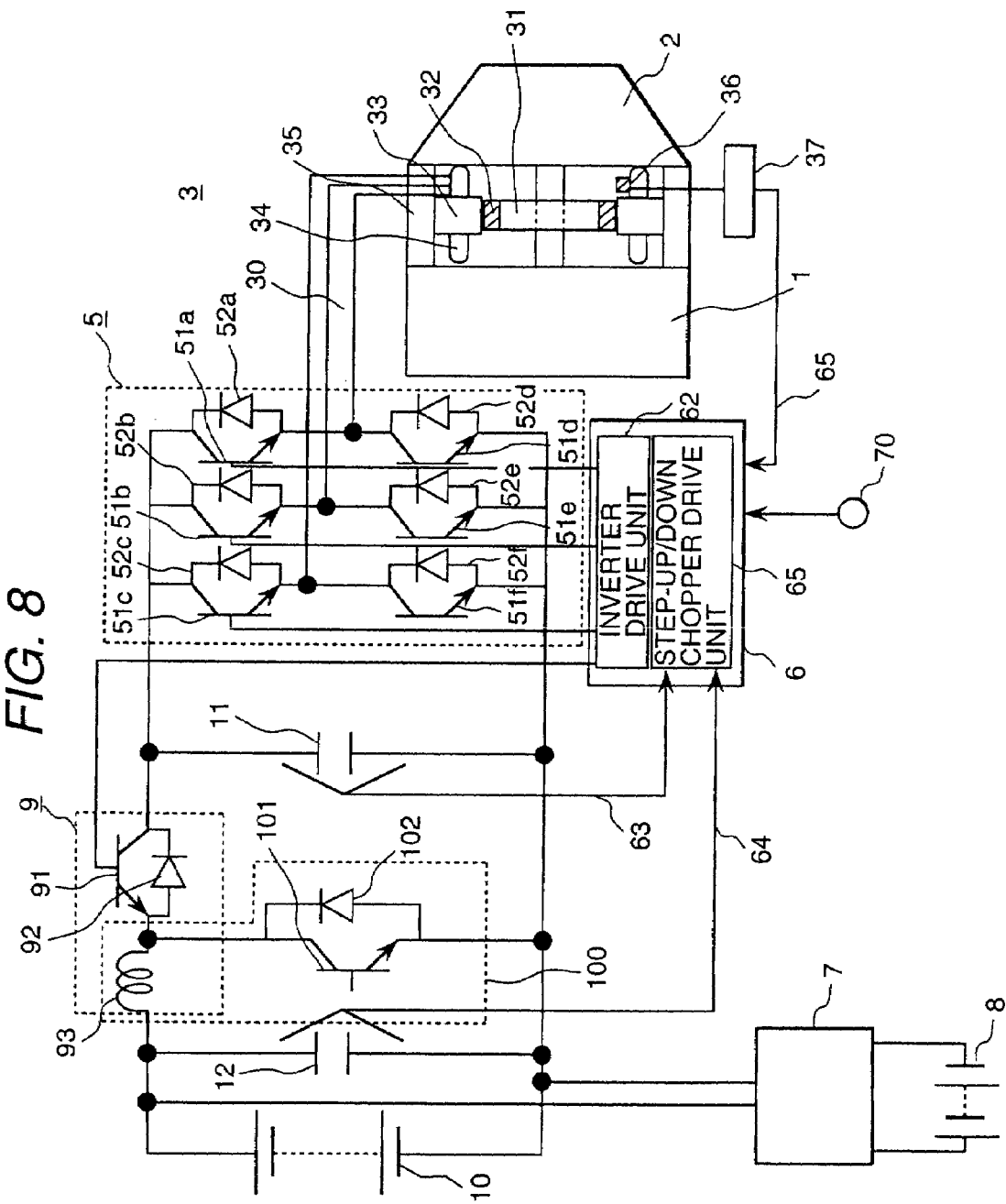
FIG. 8 is a circuit configuration diagram representing a motor generator and system as the embodiment of FIG. 7.

The following mainly describes the differences from FIG. 2 using a circuit diagram of FIG. 8:

In FIG. 8, the step-up chopper circuit 100 comprises a switching element 101 and feedback diode 102. The reactor 93 is required when the step-up chopper circuit 100 operates. Its use is shared when the step-down chopper circuit 9 operates. The low voltage battery 8 and DC-DC converter 7 are connected between the main battery 10 and step-up/down chopper circuit 100, similarly to FIGS. 1 and 2.

The following describes its operation with reference to 8. To start the internal combustion engine 1, the step-up chopper circuit 100 is operated to set the voltage higher than the battery voltage when the motor generator 3 is driven as a motor, similarly to the above description.

Figure 11:
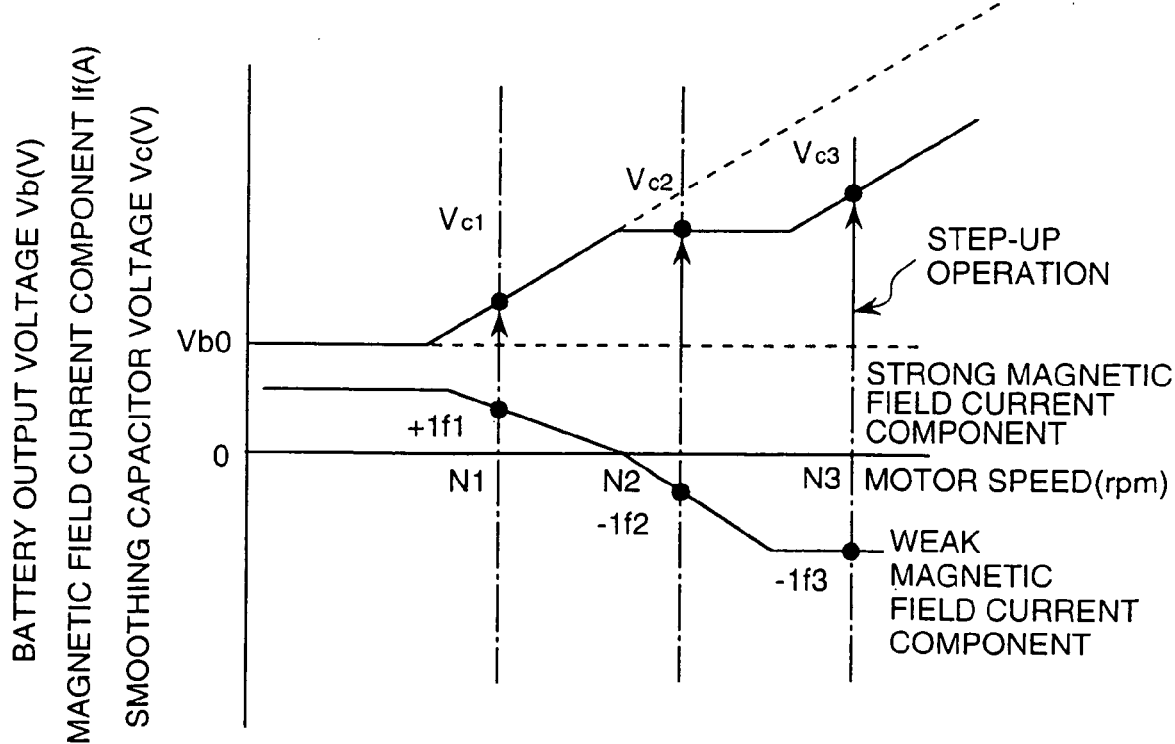
FIG. 11 is an explanatory diagram representing the system operation in the motor operation mode of the motor generator with respect to the rotational speed when the step-up chopper circuit is operating as another embodiment of the present invention, and also representing the torque characteristic and weak field current.

In this case, as shown in FIG. 11, the current phase of the stator winding 34 controlled by the inverter main circuit 5 and control circuit 6 is controlled to get the field current component which provides strong field when the rotational speed of the internal combustion engine is N1. For the step-up voltage value in this case, a current limiter (not illustrated) is provided to ensure that stator winding current flows within the range of a specified acceleration current. Until the internal combustion engine 1 starts, step-up voltage is increased to raise the rotational speed to ensure that the motor current will reach a specified acceleration current.

When the internal combustion engine 1 starts to get into the idling mode and torque assist function is used where the torque occurring to the motor is added to the torque occurring to the internal combustion engine, then the step-up chopper circuit 100 is operated to step up the voltage to be greater than battery voltage, and voltage is applied to the motor terminal. This makes it possible to provide torque assist of the internal combustion engine 1.

Figure 10:
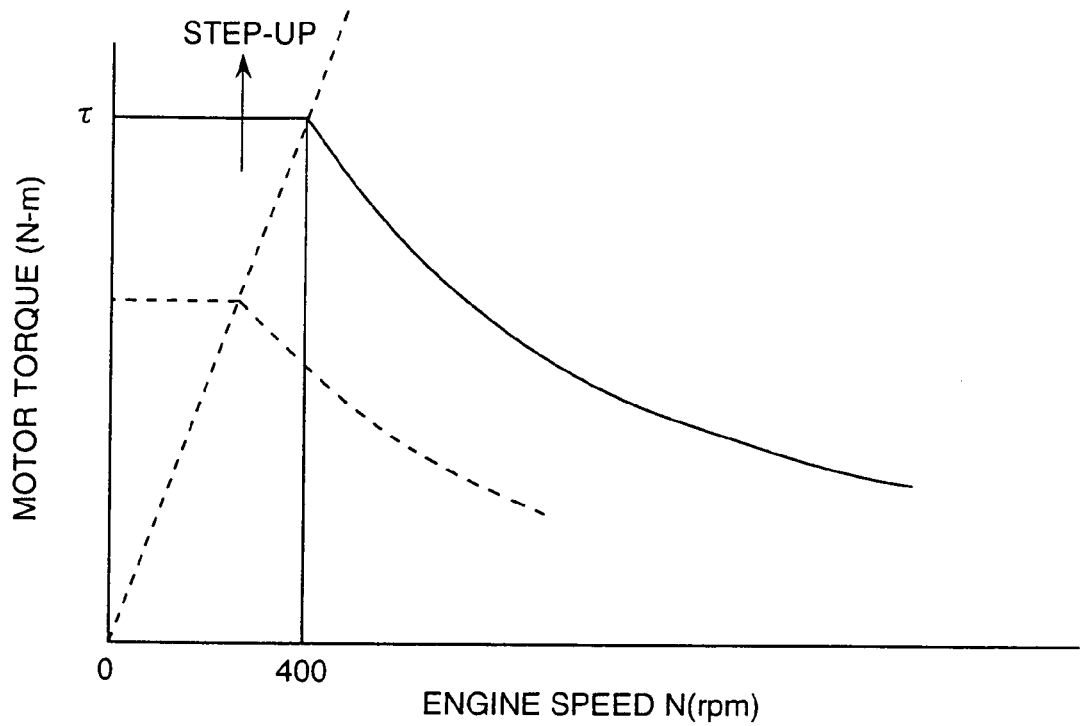
FIG. 10 is an explanatory diagram representing the step-up chopper.

FIG. 10 shows the relationship between the rotational speed of the internal combustion engine 1 and motor torque τ. The step-up chopper circuit 9 is operated to get the maximum motor torque τ in the range where the speed N of the internal combustion engine 1 is 400 rpm, for example. The current phase of the motor in this case depends of the rotational speed and assist torque. The field current component in FIG. 11 is subjected to weak field control is formed so that the weak field current component can be gained with the rise of rotational speed.

Operation of the step-up chopper circuit 100 causes the main battery 101 to be short-circuited through reactor 93 at the moment when the switching element 101 installed in parallel with main battery 10 is turned on. If the switching element 101 is turned off when a big short-circuiting current flows to the reactor, the smoothing capacitor 11 is charged by energy stored in the reactor through the diode 92. This can increase the voltage of the inverter 5 on the input side. In other words, the magnitude of voltage can be controlled, so PAM control (Pulse Amplitude Modulation) can be performed.

In this case, the conduction rate of the inverter main circuit 5 can be set to a greater value or 100% by means of driver signals of the control circuit 6. As a result, the input voltage of the driver signal is increased and the voltage can be increased by counter electromotive force of the motor generator 3 even after the internal combustion engine 1 has started. The motor terminal voltage can be increased, so acceleration current can be fed into the stator winding of the motor. This allows generation of the torque which assists the torque of the internal combustion engine 1.

If the step-up chopper circuit 100 is operated when the internal combustion engine 1 starts, current phase can be inverted-controlled, and the motor terminal voltage of the motor generator 3 can be increased in the case of the same input with the result that the motor startup current can be reduced. This allows the current capacity of switching elements 51a to 51f of the inverter main circuit 5 to be reduced.

When generation operation is performed, the step-down chopper circuit 9 is operated without operating the step-up chopper circuit 100, similarly to the case shown in FIG. 2. In this case, highly efficient operation is ensured by the concurrent use of the step-down chopper circuit 9 and current phase control of the stator winding 34 by operation of the inverter main circuit 5 and control circuit 6 because of weak field.

To supply the electric power to a low voltage system in this case, voltage from the high voltage system is stepped down through DC-DC converter 10 and is controlled to get the charging voltage of the battery 8.

When the weak field current component is excessive, the copper loss of the field winding will increase. In this case, an induction motor is better than a permanent magnet type motor.

Depending on the operation mode of the car, the permanent magnet type inductive synchronous motor generator 3 is switched to the operation mode as a motor and generator. The command value for mode selection and permanent magnet type inductive synchronous power generator 3 is evaluated and computed by the main controller 4 of a car. The permanent magnet type induction synchronous motor generator 3 is controlled by entering the command value to the microcomputer 61 of the control circuit 6 of the inverter 5.

Figure 9:
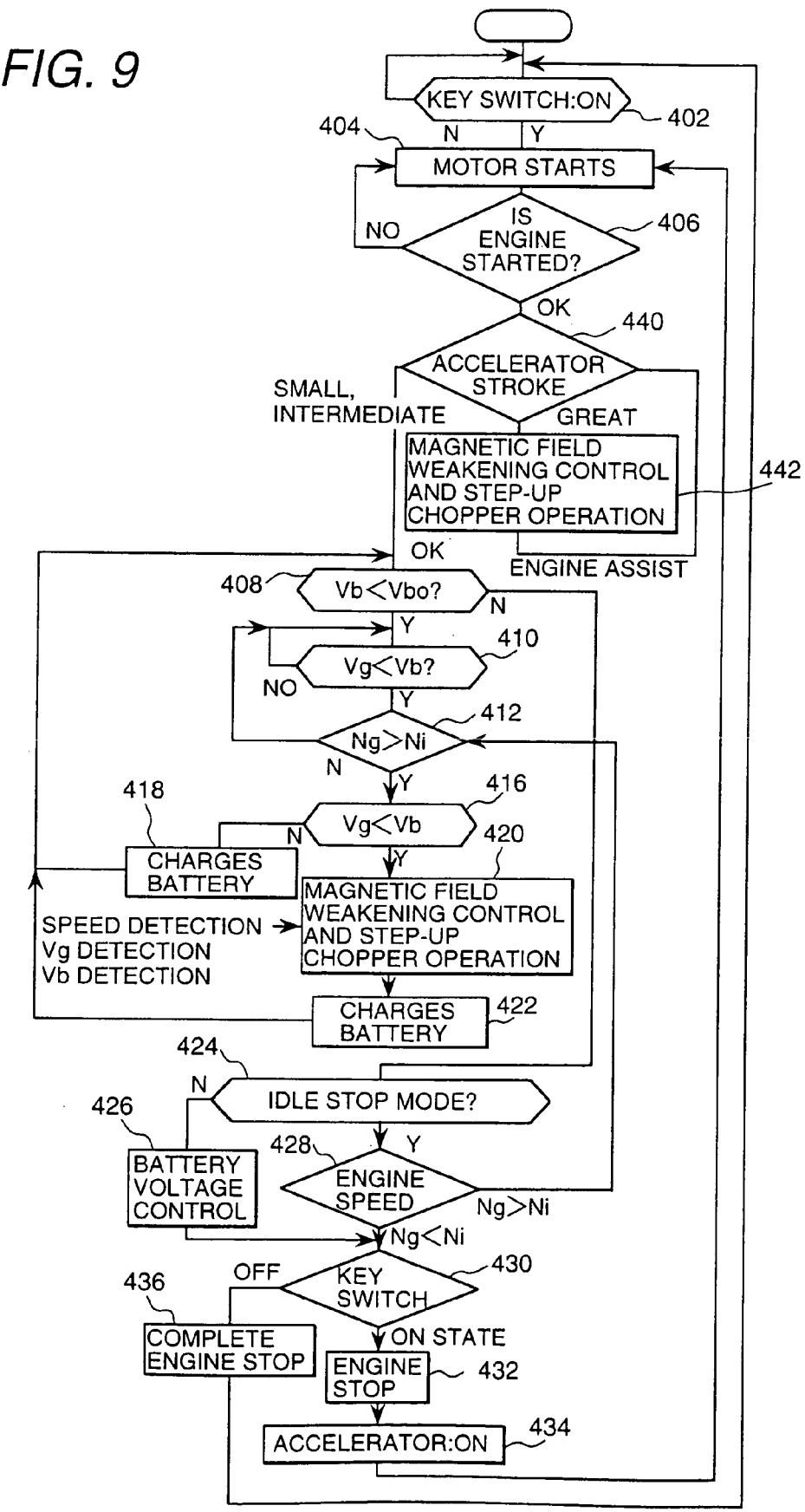
FIG. 9 is a flow diagram representing the operation in another embodiment of the present invention.

FIG. 9 shows an operation flow according to this embodiment. When the full pedal stroke/depression of the accelerator is excessive, namely, when the torque assist function is required (Step 440) immediately after the internal combustion engine has started, strong field control is performed. The driver signal is controlled and the current phase is adjusted so that the field current component decreases with a further rise of rotational speed (weak field control). At the same time, step-up chopper is also controlled (Step 440).

Figure 12A:
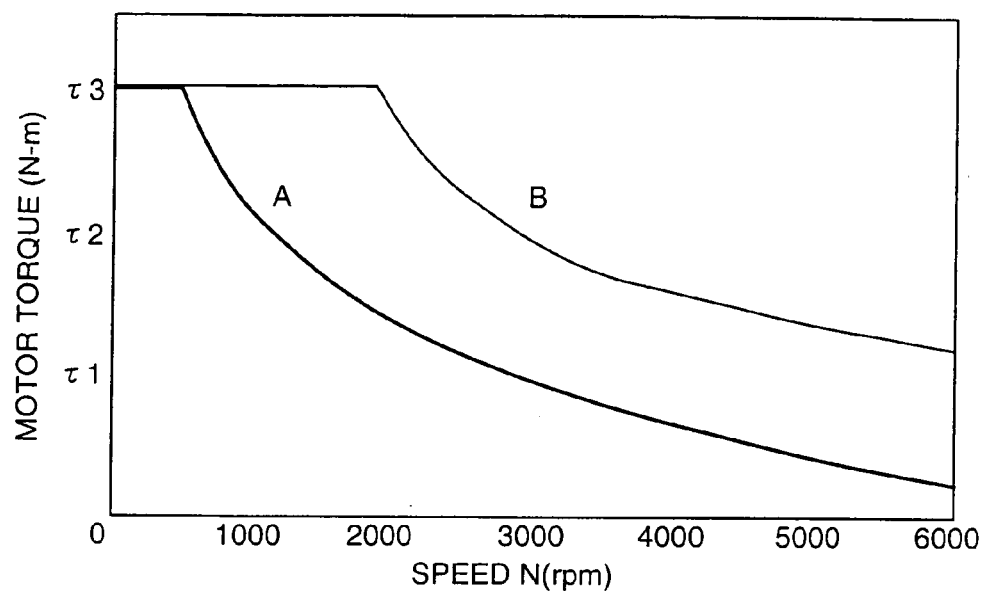
FIG. 12 is an explanatory diagram representing the changes in the starting torque in the motor operation mode of the motor generator with different rotational speed range and the field current component obtained by phase adjustment of stator winding current with respect to rotational speed.
Figure 12B:
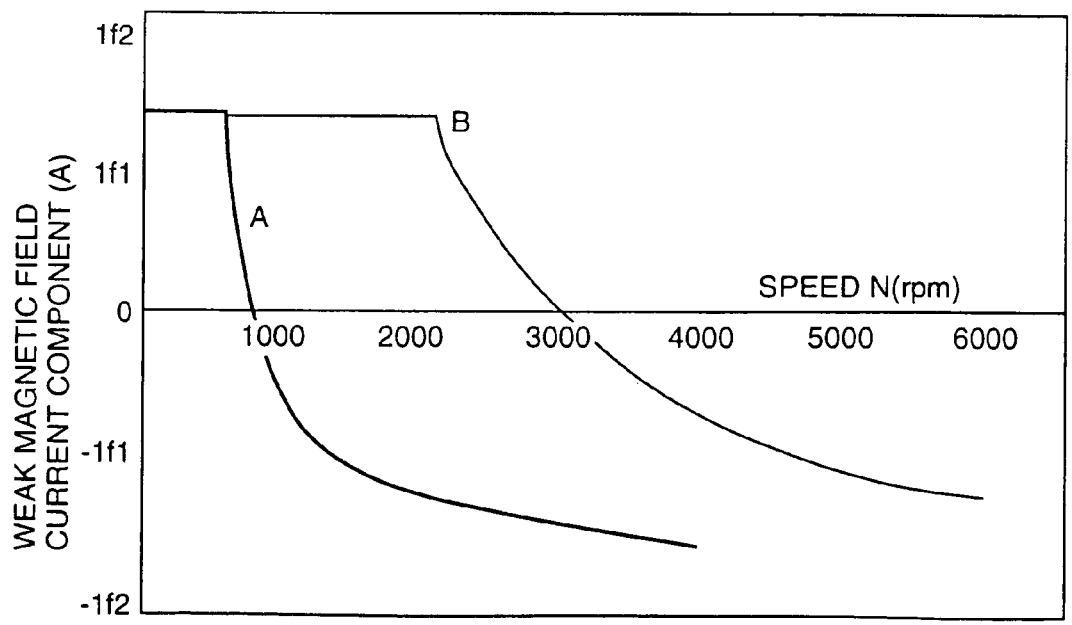

An induction motor can be adopted as a motor generator according to the present invention. FIGS. 12(a) and (b) show changes of the weak field current component by control of the motor torque and current phase of the stator winding in the motor operation mode, with respect to the rotational speed when the battery voltage is kept constant. Generally, when torque is required at a low rotational speed, control is performed so that the strong field current component is obtained. When rotational speed is high, current phase is controlled to get weak field current component in order to reduce counter electromotive force. When the field current component is positive in FIG. 7(b), the strong field control is performed. If it is negative, weak field control is performed.

The speed of the motor generator 8 (characteristic B) is 2000 rpm at the maximum torque, and the case where the maximum rotational speed is 6000 rpm. The weak field rate of the motor generator B is 2000 to 6000, namely, 1 to 3. On the other hand, the rotational speed of the motor generator A (characteristic A) is 500 rpm at the maximum torque, and the maximum rotational speed is 6000 rpm. The weak field rate of the motor generator A is 500 to 6000, namely, 1 to 12.

When the motor generator is operated in the generator mode, generation operation is performed in the range from the idling rotational speed (about 700 rpm) of the internal combustion engine to the maximum rotational speed (6000 rpm). According to the method of adjusting where the current phase of the stator winding is adjusted in a high speed, the generation voltage is excessive, so there is a shortage in the amount of weak field current component. This makes it difficult to achieve agreement with the battery charging voltage. According to the method of the present invention, however, an induction motor having characteristic B can be used as a motor generator.

As described above, the present invention provides a motor generator and its control method in a battery-mounted hybrid car where the motor generator connected to the internal combustion engine is operated in the motor operation or generator mode over the range from low to high speed. In this hybrid car, stable power torque characteristic and power generation characteristic can be ensured, and highly efficient control can be performed.

In other words, in a system where a motor generator for starting the internal combustion engine and for generating power is connected directly between the internal combustion engine and transmission, and internal combustion engine is started and power is generated by the electric power of the battery through the inverter, a step-up chopper circuit is inserted between the main (42-bolt) battery and inverter when the internal combustion engine has started, and d. c. voltage input of the inverter input is raised to a high voltage by the operation of the step-up chopper circuit and is applied in the motor operation mode of the motor generator, according to the present invention. Compared with the conventional method of strong/weak field control alone based on current phase control of the stator winding in the prior art, the present invention expands the speed range permitting operations in both the motor and generator modes, and ensures highly efficient and stable operation.

Further, the present invention offers the effect of setting a smaller value for the magnitude of weak field current control component in order to reduce the induced voltage in excess of battery charging voltage—a problem with the general permanent magnet type synchronous generator (no output in weak field)—, thanks to the voltage step-up function and voltage step-down function.

Further, when the internal combustion engine is started, a high torque is required and the starting current is increased in the motor operation mode of the motor generator. However, the present invention allows the battery voltage to be increased, and a high voltage to be input to the inverter, with the result that high voltage can be applied to the motor. This ensures high voltage output and reduces starting current. This allows the current capacity of the switching element of the main circuit of the inverter to be reduced, with the result that a less expensive inverter can be provided.

This invention provides an excellent starting characteristic and high efficiency within the operation speed range of the internal combustion engine when any one of the permanent magnet type synchronous motor generator, jaw type magnetic pole synchronous motor generator and induction motor is used as a motor generator.

What is claimed is:

1. A motor generator system having an internal combustion engine for a driving source of a car and a battery device 10 as power supply and mounted on a hybrid car, said system comprising:
   a motor generator mechanically connected with a crank shaft of the internal combustion engine;
   an inverter for controlling said motor generator;
   a control circuit for controlling said inverter; and
   a voltage control circuit provided between said battery device and said inverter;
   wherein said motor generator generates a driving force by receiving a power supplied from said battery device through said inverter;
   said motor generator generates power by receiving a motive power from the internal combustion engine, and said motor generator supplies said generated power to said battery device through said inverter;
   said inverter controls a drive of said motor generator and a power generation of said motor generator by receiving a command from said control circuit; and
   wherein when said motor generator generates said generated power by receiving the motive power from the internal combustion engine, and when said motor generator supplies said generated power to said battery device through said inverter, said voltage control circuit steps down a power generation voltage of said motor generator to form said generated power voltage of said motor generator to reach a charging voltage of said battery device.

2. A motor generator system according to claim 1, wherein
   said motor generator is a synchronous type electric rotating machine having its rotor equipped with a field magnetic pole constituted by a permanent magnet or its rotor equipped with a field magnetic pole constituted by a jaw type magnetic pole; and
   a weak field rate of said motor generator, which is expressed by a ratio between a rotational speed in the maximum torque of said motor generator and the maximum rotational speed of said motor generator, is set that when a rotational speed in the maximum torque of said motor generator is 1, and the maximum rotational speed of said motor generator is less than 4.

3. A motor generator system according to claim 1, wherein
   said motor generator is an induction type electric rotating machine having its rotor equipped plural secondary conductors arranged to an iron core; and
   a weak field rate of said motor generator, which is expressed by a ratio between a rotational speed in the maximum torque of said motor generator and the maximum rotational speed of said motor generator, is set that when a rotational speed in the maximum torque of said motor generator is 1, the maximum rotational speed of said motor generator is more than 3.

4. A motor generator system according to claim 1, wherein when said battery device includes a main battery of 42-volt charging voltage and an auxiliary battery of 14-volt charging voltage, said motor generator generates a driving force by receiving a power supplied form said main battery through said inverter, said motor generator generates said generated power by receiving the motive force from the internal combustion engine, and said motor generator supplies said generated power to said main battery through said inverter; and when said motor generator generates said generated power by receiving the motive force from the internal combustion engine and said motor generator supplies said generated power to said main battery, and when said generated power voltage of said motor generator is larger than a charging voltage of said main battery, and when said generated power voltage of said motor generator is larger than a charging voltage of said main battery, said voltage control circuit, which is supplied to said main battery through said inverter, steps down said generated power voltage of said motor generator to form said generated power voltage of said motor generator to reach a charging voltage of said main battery.

5. A motor generator system according to claim 1, wherein when said motor generator generates said generated power by receiving the motive force from the internal combustion engine and said motor generator supplies said generated power to said battery device through said inverter, and a weak field control for controlling a step-down control according to said voltage control circuit and a current phase of a stator winding of said motor generator is carried out by said inverter to provide a weak field component, thereby said generated voltage of said motor generator agrees with said charging voltage of said battery device.

6. A motor generator system according to claim 1, wherein when said motor generator generates said generated power by receiving the motive force from the internal combustion engine and said motor generator supplies said generated power to said battery device through said inverter, substantially at an idling rotational speed of the internal combustion engine, a strong field control for controlling a current phase of a stator winding of said motor generator is carried out by said inverter to provide a strong field control;

with an increase of a rotational speed of the internal combustion engine, a strong field control for controlling said current phase of said stator winding of said motor generator is carried out by said inverter to provide a strong field component and a power generation voltage of said motor generator is kept to maintain the charging voltage of said battery device;

when the rotational speed of the internal combustion engine increase further, a weak field control for controlling said current phase of said stator winding of said motor generator is carried out by said inverter to provide a weak component; and under a state in which said weak component is maintained, a step-down voltage control according to said voltage control circuit is carried out, whereby said generated voltage of said motor generator is substantially the same as said charging voltage of said battery device.

7. A motor generator system according to claim 1, wherein said voltage control circuit is constituted by a step-down chopper.

8. A motor generator system having an internal combustion engine for a driving source of a car and a battery device as a power supply and mounted on a hybrid car, said system comprising:

a motor generator mechanically connected with a crank shaft of the internal combustion engine;

an inverter for controlling said motor generator;

a control circuit for controlling said inverter; and a voltage control circuit provided between said battery device and said inverter;

wherein said motor generator generates a driving force by receiving a power supplied from said battery device through said inverter;

said motor generator generates power by receiving a motive power from the internal combustion engine, and said motor generator supplies said generated power to said battery device through said inverter;

said inverter controls a drive of said motor generator and power generation of said motor generator by receiving a command from said control circuit; and when a driving force is generated by receiving a supply of said power from said battery device and the internal combustion engine begins to start by said driving force, said voltage control circuit steps up a voltage of a battery power outputted from said battery device.

9. A motor generator system according to claim 8, wherein said motor generator is a synchronous type electric rotating machine having its rotor equipped with a field magnetic pole constituted by a permanent magnet or its rotor equipped with a field magnetic pole constituted by a jaw type magnetic pole; and a weak field rate of said motor generator, which is expressed by a ratio between a rotational speed in the maximum torque of said motor generator and the maximum rotational speed of said motor generator, is set that when a rotational speed in the maximum torque of said motor generator is 1, the maximum rotational speed of said motor generator is less than 4.

10. A motor generator system according to claim 8, wherein said motor generator is an induction type electric rotating machine having its rotor equipped plural secondary conductors arranged to an iron core; and a weak field rate of said motor generator, which is expressed by a ratio between a rotational speed in the maximum torque of said motor generator and the maximum rotational speed of said motor generator, is set that when a rotational speed in the maximum torque of said motor generator is 1, the maximum rotational speed of said motor generator is more than 3.

11. A motor generator system according to claim 8, wherein when said battery device includes a main battery of 42-volt charging voltage and an auxiliary battery of 14-volt charging voltage, said motor generator generates a driving force by receiving a power supplied from said main battery through said inverter, said motor generator generates said generated power by receiving the motive force from the internal combustion engine, and said motor generator supplies said generated power to said main battery through said inverter; and when said motor generator generates a driving force by receiving a supply of a power from said battery device through said inverter and the internal combustion engine begins to start by said driving force, said voltage control circuit steps up a voltage of a battery power outputted from said main batter.

12. A motor generator system according to claim 8, wherein
when said motor generator generates a driving force by receiving a supply of a power from said battery device through said inverter and the internal combustion engine begins to start by said driving force, a strong field control for controlling a current phase of a stator winding of said motor generator is carried out by said inverter to provide a strong field current component.

13. A motor generator system according to claim 8, wherein
when said motor generator generates a driving force by receiving a supply of a power from said battery device through said inverter, and when the internal combustion engine begins to start by said driving force, until a rotational speed of the internal combustion engine for necessary the maximum torque of said motor generator is reached, a step-up voltage control according to said voltage control circuit and a strong field control for controlling a current phase of a stator winding of said motor generator carries out by said inverter to get a strong field current component;
until a rotational speed area larger than a rotational speed during a start time of the internal combustion engine is reached, when a torque assist is carried out according to said motor generator, a weak field control for controlling said current phase of said stator winding of said motor generator by said inverter and a step-up voltage control according to said voltage control circuit are carried out to provide a weak field current component.

14. A motor generator system according to claim 8, wherein
a conversion voltage ratio of a battery voltage of said voltage control circuit is set at 1.5 times or more, and a current capacity of a switching element of said inverter circuit is smaller than a current capacity of a switching element of said voltage control circuit.

15. A motor generator system according to claim 8, wherein
said voltage control circuit is constituted by step-up chopper.

16. A motor generator system having an internal combustion engine for a driving source of a car and a battery device as a power supply and mounted on a hybrid car, said system comprising:
a motor generator mechanically connected with a crank shaft of the internal combustion engine;
an inverter for controlling said motor generator;
a control circuit for controlling said inverter; and
a voltage control circuit provided between said battery device and said inverter;
wherein said motor generator generates a driving force by receiving a power supplied from said battery device through said inverter;
said motor generator generates a power by receiving a motive power from the internal combustion engine, and said motor generator supplies generated power to said battery device through said inverter;

said inverter controls a drive of said motor generator and a power generation of said motor generator by receiving a command from said control circuit;

wherein when said motor generator generates a driving force by receiving a supply of a power from said battery device through said inverter and the internal combustion engine begins to start by said driving force, said voltage control circuit steps up a voltage of a battery power outputted from said battery device; and wherein when said motor generator generates said generated power by receiving the motive force from the internal combustion engine and said motor generator supplies said generated power to said battery device, said voltage control circuit supplied to said battery device through said inverter steps down said generated power voltage of said motor generator to form said generated power voltage of said motor generator to reach a charging voltage of said battery device.

17. A motor generator system according to claim 16, wherein
said voltage control circuit comprises a step-down chopper and a step-up chopper.

18. A motor generator system according to claim 16, wherein
said motor generator is a synchronous type electric rotating machine having its rotor equipped with a field magnetic pole constituted by a permanent magnet or its rotor equipped with a field magnetic pole constituted by a jaw type magnetic pole; and
a weak field rate of said motor generator, which is expressed by a ratio between a rotational speed in the maximum torque of said motor generator and the maximum rotational speed of said motor generator is set that when a rotational speed in the maximum torque of said motor generator is 1, the maximum rotational speed of said motor generator is less than 4.

19. A motor generator system according to claim 16, wherein
said motor generator is an induction type electric rotating machine having its rotor equipped plural secondary conductors arranged to an iron core; and
a weak field rate of said motor generator, which is expressed by a ratio between a rotational speed in the maximum torque of said motor generator and the maximum rotational speed of said motor generator is set that when a rotational speed in the maximum torque of said motor generator is 1, the maximum rotational speed of said motor generator is more than 3.

20. A motor generator system according to claim 16, wherein
when said battery device includes a main battery of 42-volt charging voltage and an auxiliary battery of 14-volt charging voltage, said motor generator generates a driving force by receiving a power supplied form said main battery through said inverter, said motor generator generates said generated power by receiving the motive force from the internal combustion engine, and said motor generator supplies said generated power to said main battery through said inverter;
when said motor generator generates said generated power by receiving the motive force from the internal combustion engine and said motor generator supplies said generated power to said main battery, and when said generated power voltage of said motor generator is larger than a charging voltage of said main battery, said voltage control circuit supplied to said main battery through said inverter steps down said generated power voltage of said motor generator to form said generated power voltage of said motor generator to reach a charging voltage of said main battery; and when said motor generator generates a driving force by receiving a supply of a power from said main battery through said inverter and the internal combustion engine begins to start by said driving force, said voltage control circuit steps up a voltage of a battery power outputted from said main battery.

21. A motor generator system according to claim 16, wherein when said motor generator generates said generated power by receiving the motive force from the internal combustion engine and said motor generator supplies said generated power to said battery device through said inverter, and a weak field control for controlling a step-down control according to said voltage control circuit and a current phase of a stator winding of said motor generator is carried out by said inverter to get a weak field component, thereby said generated voltage of said motor generator agrees with said charging voltage of said battery device; and when said motor generator generates a driving force by receiving a supply of a power from said battery device through said inverter and when the internal combustion engine begins to start by said driving force, a strong field control for controlling a current phase of a stator winding of said motor generator is carried out by said inverter to get a strong field current component.

* * * * *